(12) United States Patent
Arana

(10) Patent No.: US 10,594,787 B2
(45) Date of Patent: Mar. 17, 2020

(54) SYSTEM AND METHOD FOR PRESENCE OR PROXIMITY-BASED SORTING

(71) Applicant: Disney Enterprises, Inc., Burbank, CA (US)

(72) Inventor: Mark Arana, Agoura Hills, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 399 days.

(21) Appl. No.: 15/097,148

(22) Filed: Apr. 12, 2016

(65) Prior Publication Data
US 2017/0295227 A1    Oct. 12, 2017

(51) Int. Cl.
*G06F 15/16* (2006.01)
*H04L 29/08* (2006.01)
*H04W 4/02* (2018.01)

(52) U.S. Cl.
CPC .......... *H04L 67/1044* (2013.01); *H04L 67/18* (2013.01); *H04W 4/025* (2013.01)

(58) Field of Classification Search
CPC .............................. H04L 67/1044; H04L 67/18
USPC ................................................. 709/203, 205
See application file for complete search history.

(56) References Cited

U.S. PATENT DOCUMENTS

| | | | |
|---|---|---|---|
| 7,541,930 B2 | 6/2009 | Saarisalo et al. | |
| 8,305,271 B2 | 11/2012 | Li et al. | |
| 8,422,944 B2 | 4/2013 | Flygh et al. | |
| 8,554,970 B2 | 10/2013 | Suumaki et al. | |
| 9,622,024 B1* | 4/2017 | Shanmugam | H04L 41/0806 |
| 2003/0096621 A1 | 5/2003 | Jana et al. | |
| 2006/0085419 A1* | 4/2006 | Rosen | G06Q 30/02 |
| 2011/0029370 A1 | 2/2011 | Roeding et al. | |
| 2014/0132411 A1 | 5/2014 | Buchheim et al. | |
| 2014/0273834 A1 | 9/2014 | Merckling | |
| 2015/0081367 A1 | 3/2015 | Westlake | |
| 2015/0156172 A1* | 6/2015 | Nandi | G06Q 30/0282 713/153 |
| 2016/0021500 A1* | 1/2016 | Won | H04W 40/244 455/456.2 |
| 2016/0189227 A1* | 6/2016 | Gandhi | G06Q 30/0261 705/14.58 |
| 2016/0227359 A1* | 8/2016 | Hurewitz | H04W 4/02 |
| 2016/0302036 A1* | 10/2016 | Chan | H04W 4/025 |
| 2016/0302042 A1* | 10/2016 | Handly | H04W 4/021 |

OTHER PUBLICATIONS

Shariar, Shaffat, Location based content delivery solution using iBeacon, URL:http://www.diva-portal.org/smash/record.jsf?pid=diva2%3A8527448&dswid=1514; Oct. 2015, Retrieved from Online on Oct. 1, 2015 (Oct. 1, 2015), pp. 1-35.

(Continued)

*Primary Examiner* — Duyen M Doan
(74) *Attorney, Agent, or Firm* — Sheppard Mullin Richter & Hampton LLP

(57) ABSTRACT

Systems and methods are provided for proximity-based sorting. Information may be transmitted to user devices from beacons or similar transmitter-type devices. Based on this information, the user devices may be categorized or sorted based upon which beacons the user devices are proximate to, pass, or from which beacon the information is received. Subsequent activities and/or operations may then leverage this categorization or sorting of users.

20 Claims, 5 Drawing Sheets

(56) References Cited

OTHER PUBLICATIONS

Khan, Asif, Six ways to leverage beacons and Improve your Retail Environment, URL:http://www.shoppertrak.com/blog/six-ways-beacons-improve-retail-environment/, Aug. 26, 2015, Retrieved from Online on Oct. 1, 2015, pp. 1-8.

Cisco, IBeacon—Frequently Asked Questons, URL: http://www.cisco.com/c/dam/en/us/solutions/collateral/enterprise-networks/connected-mobile-experiences/ibeacon_faq.pdf, 2014, Retrieved from online on Oct. 1, 2015, pp. 1-13.

Reddy, Trips, 15 Companies From Airports to Retail Already Using Beacon Technology, URL: https://www.umbel.com/blog/mobile/15-companies-using-beacon-technology/, Nov. 10, 2014, Retrieved from Online on Oct. 1 2015, pp. 1-15.

Valkkynen et al., Physical Browsing, Url: http://www.artechhouse.com/uploads/public/documents/chapters/Vasilakos_963_CH04_pdf, 2006, Retrieved from Online on Oct. 1, 2015, pp. 61-81.

\* cited by examiner

Receive a first signal from a first beacon at a first user device proximate to the first beacon
200

Receive a second signal from a second beacon at a second user device proximate to the second beacon
202

Associate a first user of the first user device with a first group and associate a second user of the second user device with a second group, wherein the first and second groups are utilized to distinguish the first and second users in one or more subsequent activities
204

FIG. 2

SYSTEM AND METHOD FOR PRESENCE OR PROXIMITY-BASED SORTING

TECHNICAL FIELD

The present disclosure relates generally to entertainment experiences and the grouping of patrons for use in such entertainment experiences.

DESCRIPTION OF THE RELATED ART

A transmitter may transmit signals.

BRIEF SUMMARY OF THE DISCLOSURE

In accordance with one embodiment, a computer-implemented method for sorting may comprise receiving a first signal from a first beacon at a first user device proximate to the first beacon, and receiving a second signal from a second beacon at a second user device. The computer-implemented method further comprises associating a first user of the first user device with a first group and associating a second user of the second user device with a second group, wherein the first and second groups are utilized to distinguish the first and second users in one or more subsequent activities.

In accordance with a second embodiment, a computer-implemented method for sorting comprises receiving a radio frequency (RF) signal from an RF transmitter at a first user device upon the first user device coming in proximity to the RF transmitter. Furthermore, the computer-implemented method comprises transmitting data associated with the first user device to the RF transmitter. Further still, the computer-implemented method comprises presenting one or more subsequent interactive experiences via the first user device based upon a categorization of the first user device and the transmitted data.

In accordance with a third embodiment, a system comprises a first user device and a second user device. The system further comprises a first identification device with which the first user device exchanges first information used in categorizing the first user device in a first group when the first user device is proximate to the first identification device. Moreover, the system comprises a second identification device with which the second user device exchanges second information used in categorizing the second user device in a second group when the second user device is proximate to the second identification device. The categorization of the first user device in the first group and the categorization of the second user device in the second group is used to distinguish a first user of the first user device and a second user of the second user device in a subsequent activity in which the first and second users participate.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a flow chart illustrating example processes performed for achieving proximity-based sorting in accordance with one embodiment.

The figures are not exhaustive and do not limit the present disclosure to the precise form disclosed.

DETAILED DESCRIPTION

A beacon can refer to a particular type of transmitter that transmits, for example, a continuous or periodic radio signal having limited information content. The limited information content may be the beacon's identity or location. Beacons can be utilized for various applications including, but not limited to navigation, mapping, radio frequency identification (RFID), device locating, and indoor guidance. The general idea of periodically broadcasting limited information via beacons or devices configured to operate like beacons has been utilized in other contexts as well, such as in Wi-Fi communications where a wireless access point can broadcast identification information related to access channels and/or security protocol-related information.

User devices, such as smart phones and tablet personal computers (PCs) may be utilized in conjunction with transmitters, such as beacons. In particular, the location of a user device may be determined based upon the receipt of radio frequency (RF) signals broadcast by a beacon. Upon determining the physical location of the user device based on its receipt of the RF signals broadcast by the beacon, customized transmission of information to that user device can be achieved, such as targeted advertising. Such conventional beacon-based technologies, however, fail to further leverage information gleaned from the interaction between a beacon and a user device for subsequent use in other applications.

Accordingly, various embodiments described in the present disclosure provide systems and methods for sorting or pre-determining groups of users based on their proximity to one or more beacons. It should be noted that various embodiments described herein are presented in the context of beacon-based technologies involving, in some embodiments, the transmission of signals from a beacon to one or more user devices. Nevertheless, the present disclosure contemplates the use of other technologies, such as RFID-based technology, near field communications (NFC)-based technology, quick response (QR) code-based technology, and the like. Such alternative technologies may be utilized instead of or in addition to beacon-based technology in order to implement the sorting of patrons based on proximity.

Figure 1:
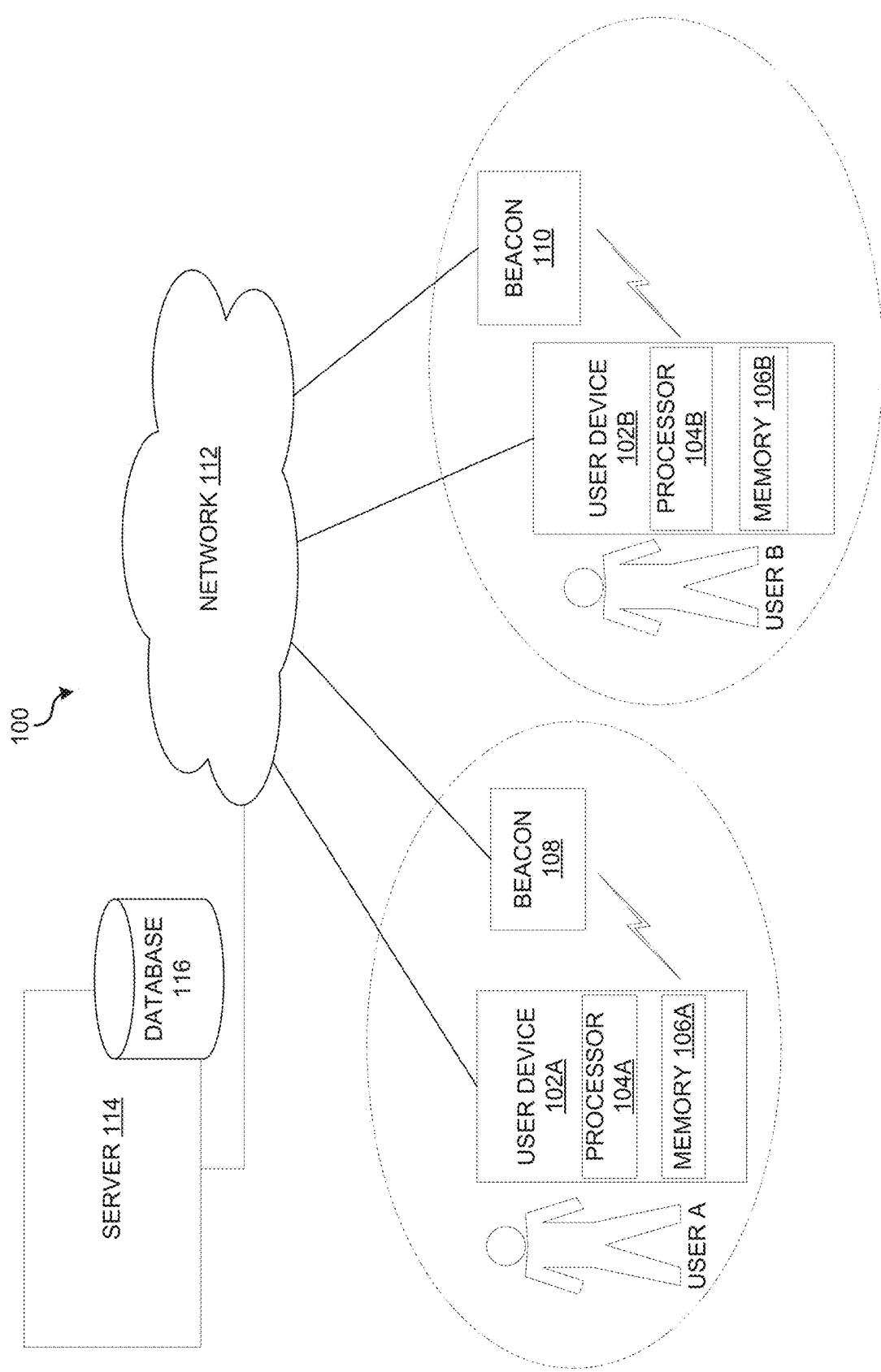
FIG. 1 illustrates an example environment in which various embodiments may be implemented.

FIG. 1 illustrates an example system 100 for proximity-based sorting in accordance with various embodiments of the present disclosure. FIG. 2 is a flow chart illustrating example processes performed for proximity-based sorting in accordance with one embodiment of the present disclosure and will be discussed in conjunction with FIG. 1.

In the example system 100, user devices 102A and 102B may be a tablet PC, a smart phone, a laptop PC, or some alternative form of media accessing or presentation device, communication device, etc. User devices 102A and 102B may each have respective processors 104A and 104B, as well as respective memory units 106A and 106B. User devices 102A and 102B may be configured to access media content, games, and the like stored on or provided via its respective memory unit and/or a server whether locally or physically stored, or via cloud or network storage. The memory units 106A and 106B may store user information, such as identification information and/or user preferences, such as favorite sports teams, movies, types of movies, video games, user profiles, etc.

In some embodiments, one or more of user devices 102A and 102B may be a wearable identification device, such as a watch, an ID band with a code associated with a user, etc. User devices 102A and 102B may belong to or may be operated by a user, i.e., the user's personal device, or may be provided by some entity, such as a business establishment. As illustrated in FIG. 1, user device 102A may be associated with user A, and user device 102B may be associated with user B.

Users A and B (and their respective user devices 102A and 102B) may be present at a particular locale. For example, user devices 102A and 102B may be smart phones, and users A and B may be present at a movie theater. As also illustrated in FIG. 1, system 100 may include a beacon 108, which may be physically located at or near a first door to the movie theater, and a beacon 110, which may be physically located at or near a second door of the movie theater.

Referring to FIG. 2, at operation 200, a first signal from a first beacon is received at a first user device proximate to the first beacon. That is, in the example system of FIG. 1, upon user A entering the first door and passing or coming into proximity to beacon 108, user device 102A receives a signal from beacon 108. At operation 202, a second signal from a second beacon is received at a second user device proximate to the first beacon. That is, upon user B entering the second door and passing or coming into proximity to beacon 110, user device 102B receives a signal from beacon 110.

It should be noted that the operating range(s) of beacons 108 and 110 and/or user devices 102A and 102B may determine how near a user device must be in order to receive a signal. In some embodiments, beacons 108 and 110 may be Bluetooth® beacons or nodes that transmit RF signals in a particular frequency band that can be received by user devices 102A and 102B which have Bluetooth transceivers capable of receiving the RF signals. Therefore, the Bluetooth® operating range may determine how close to beacons 108 and 110 user devices 102A and 102B may need to be in order to receive a signal, e.g., less than 10 meters for Class 3 Bluetooth® devices, 100 meters for Class 1 Bluetooth® devices, etc.

As alluded to previously, in some embodiments, instead of beacons, QR codes may be made available at the first and second doors. In this way, user A may scan the QR code associated with the first door upon passing through the first door, while user B may scan the QR code associated with the second door upon passing through the second door. In other embodiments, a first NFC reader may be located at or near the first door and a second NFC reader may be located at or near the second door. Upon users A and B passing through the first and second doors, respectively, users A and B may touch their user devices 102A and 102B to the corresponding NFC readers.

Whether system 100 utilizes beacons, such as beacons 108 and 110, or another form of identifying mechanism or device, examples of which are discussed above, users A and B may be grouped or categorized based upon some criteria. In the above example, the criteria is which door users A and B use to enter the movie theater. In other contexts, the criteria for sorting patrons may be which amusement park gate patrons enter. In still other contexts, a timing element may be incorporated, where beacons 108 and 110 may transmit a timestamp along with their respective RF signals, or user devices 102A and 102B may timestamp a received RF signal. In some embodiments, beacons 108 and 110 may be different types of beacons or identification devices. For example, beacon 108 may be a Bluetooth® beacon and beacon 110 may be a Wi-Fi access point or beacon, and sorting criteria may include the type of communication standard or technology applicable to a beacon/user device.

Referring back to FIG. 2, at operation 204, a first user (e.g., user A) of the first user device (user device 102A) is associated with a first group and a second user (e.g., user B) of the second user device (e.g., user device 102B) is associated with a second group, wherein the first and second groups are utilized to distinguish the first and second users in one or more subsequent activities. That is, the RF signals transmitted by beacons 108 and 110 and received by user devices 102A and 102B may be RF signals that communicate beacon identifying information, such as a unique ID. The unique ID may be a string of alphanumeric characters or some other appropriate identifier. Upon receiving an RF signal from a beacon, such as beacon 108, for example, upon user A receiving an RF signal from beacon 108, an application resident on user device 102A parses the RF signal to determine the unique ID. The application may then access a local datastore, such as memory unit 106A, and associate the unique ID value with some group or category.

Alternatively, server 114 may also be accessed by the application resident on user device 102A in order to perform the aforementioned association of the unique ID of beacon 108 with a group or category. Communications between one or more of server 114/database 116, and/or user devices 102A and 102B can be effectuated over a network 112. Network 112 may be any cable, wire, and/or wireless communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 112 may employ various communication media, such as a coaxial cable, fiber optic cable system, Ethernet, radio waves, etc.

As described above, users A and B (user devices 102A and 102B) may be grouped or sorted based upon some criteria associated with the particular beacon from which an RF signal is received. Continuing with the movie theater example, the movie theater proprietor may wish to engage movie patrons in an interactive game or activity prior to viewing a superhero action movie. User A, based upon the criteria of entering the movie theater through the first door, can be placed into a hero category, while user B, based upon the criteria of entering the movie theater through the second door, can be placed into a villain category. The application resident on user devices 102A and 102B may notify or otherwise inform users A and B, respectively, of their status, i.e., hero or villain. The interactive game may then commence with user A along with other patrons grouped into the hero category (by virtue of those patrons also entering the movie theater through the first door, receiving an RF signal from beacon 108, etc.) as a first team. User B (along with other patrons grouped into the villain category (by virtue of those patrons also entering the movie theater through the second door, receiving an RF signal from beacon 110, etc.) may play as a second team. Alternatively, the grouping or categorization of users A and B may remain hidden or transparent to users A and B. Indeed, patrons need not necessarily know they are being sorted or categorized. Users A, B, and their corresponding teams may engage in the game or activity without knowing what team they are on until completion of the game, for example. In cases where patrons are informed of their categorization or team, patrons may be allowed to "switch sides."

It can be appreciated that the interactive game may, but need not be a game played on user devices 102A and 102B. That is, the interactive game can be a non-computerized, audience-participation type game or experience. In instances when the interactive game is played on patrons' respective user devices, the user-assigned category may be used for other purposes, such as presenting a particular theme (hero or villain) when the game is played and/or invoking corresponding media content discovery. Still other uses for the proximity-based sorting of patrons can include the presentation of a particular prize (hero-themed or villain-themed) upon completion of the game.

Moreover, it should be understood that the proximity-based grouping of patrons or users as described in the present disclosure can be for the purpose of a subsequent or "later" game, experience, or activity. As described previously, conventional beacon-based technologies are limited to targeted information delivery directly associated with the beacon. For example, a store-specific shopping application resident on a smartphone may notify a patron of sales or coupons upon entering a store and receiving a signal from the beacon. However, upon the patron leaving the proximity of that store/beacon, targeted information delivery ceases. In contrast, the proximity-based grouping achieved in accordance with various embodiments of the present disclosure can be utilized as a data point for many different uses and/or applications.

Accordingly, once a user, e.g., user A, has been categorized or tagged as a hero, user A may receive notifications for hero-associated merchandise of a particular movie franchise well after user A has left the movie theater. In the event that user A has a gaming profile to which the aforementioned application has access, any superhero computer game or application may be invoked with user A playing a hero by default. Additionally still, user device 102A may, in addition to accessing server 114/database 116 to determine a group or category associated with beacon 108, may also transmit user A's profile or media, gaming, or other preferences to server 114 so that user A's involvement in subsequent games or activities can leverage the assigned group or category.

As previously indicated, the present disclosure contemplates embodiments wherein coded ID bracelets may be utilized. Coded ID bracelets may be wearable RFID or NFC tags that can be sensed by an appropriate reader or sensor. In such embodiments, when a reader or sensor recognizes a coded ID bracelet, a system or server to which the reader or sensor is operatively connected can tag or assign a user or entity associated with the coded ID bracelet to a particular group or category. Therefore, instead of sorting a patron based upon the door or entrance utilized by the patron, the patron can be categorized such that the categorization can be used to guide, route, or otherwise direct the patron. For example, in an amusement park scenario, user A associated with user device 102A (which may be embodied by a coded ID bracelet) may be tagged as a hero when user A passes a turnstile to a particular amusement park ride or attraction. User B associated with user device 102B (which may also be embodied by a coded ID bracelet) may be tagged as a villain when user B passes the turnstile to that same amusement park ride or attraction. Thereafter, users A and B may be routed to different ride or attraction vehicles or subsequent entry points.

Additionally, the coded ID bracelet may be associated with a user profile which can be leveraged in conjunction with the aforementioned grouping. For example, a user profile may include information regarding a user's favorite movie or computer game, and upon being categorized as a hero or villain (following the above example), a corresponding character from the user's favorite movie or computer game can be used to present notifications, used as a guide, etc. during the user's stay at the amusement park.

Other examples of subsequent activities may include automatic entry into a raffle based upon information that a user was physically present or proximate to a location at which a beacon or other identifying mechanism or device is implemented. As another example, a user may be tagged as being present at a particular location, such as a studio-run amusement park, based upon the receipt of an RF signal from a beacon at that particular location. Accordingly, the user may subsequently receive coupons at various retail locations selling products associated with the studio.

Proximity-based sorting may also be used in the context of fraud prevention. For example, following the above amusement park example, a user may engage in a scavenger hunt within the amusement park, where prizes can be obtained based upon a user's presence at a particular location. Prize winnings can be verified prior to distribution by checking whether or not a user device has been tagged or categorized as actually being present at the particular location vis-à-vis reception of beacon signals at those locations.

In the previously-described embodiments, beacons, e.g., beacons 108 and 110 merely broadcast or send limited information, such as a unique ID, to user devices 102A and 102B. User devices 102A and 102B may then access a local datastore, or remotely access server 114/database 116 to complete sorting or categorization. In some embodiments, however, beacons 108 and 110 may send corresponding group or category-related information in an RF signal. That is, the application resident on user devices 102A and 102B need not access any local memory or server/database such as server 114/database 116 in order to complete the sorting or categorization process. Hence, user devices 102A and 102B, upon parsing an RF signal from a beacon can directly determine the group or category to which it or its associated user is assigned. In some embodiments, related group or category information may be transmitted by beacons 108 and 110, but actual categorization or tagging of user devices 102A and 102B or the respective users thereof is performed at, e.g., server 114/database 116.

In still other embodiments, network 112 may be a Wi-Fi network designated as "Alpha," where network 112 includes wireless access points (WAPs) "Alpha1" and "Alpha2" (which may be embodiments of beacons 108 and 110, respectively) having the same service set identifier (SSID) "Alpha," which could be utilized as another form of sorting mechanism. For example, user device 102A may connect to SSID Alpha via WAP Alpha1, resulting in user device 102A being tagged as "Group A." Should user 102A connect to SSID Alpha via WAP "Alpha2," user device 102A can be tagged into "Group B." If user 102A connects/reconnects to SSID Alpha via both WAPs Alpha1 and Alpha2 within some predetermined period of time, user device 102A may be tagged with either the last WAP through which access was gained to SSID Alpha. In some embodiments, user 102A may be tagged into Group C, " Group C being indicative of the fact that a user or user device has obtained access via multiple WAPs.

In accordance with some embodiments, contemplated scenarios include those where a user or user device which has already been sorted or categorized passes another beacon, for example. In one embodiment, an already grouped user device that encounters another beacon maintains its current assignment or category. In another embodiment, the user device may change its previous categorization to that of a more recent beacon upon nearing or passing by a new beacon. In another embodiment still, the user device may maintain a record of beacons the user or user device passes by. In this way, a type of scoring system is effectuated wherein the beacon(s) to which a user has the highest affinity may be determined.

Figure 3:
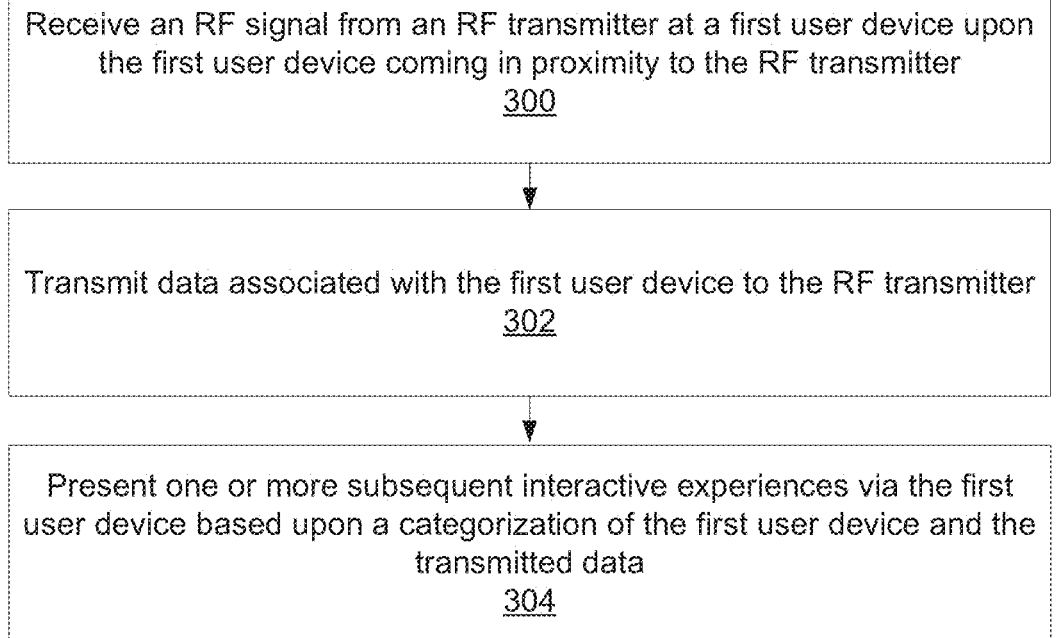
FIG. 3 is a flow chart illustrating example processes performed for achieving proximity-based sorting in accordance with another embodiment.

In some embodiments, user devices and beacons may exchange information rather than user devices solely receiving data from beacons. FIG. 3 is a flow chart illustrating example operations performed for proximity-based sorting in accordance with another embodiment. At operation 300, an RF signal from an RF transmitter is received at a first user device upon the first user device coming in proximity to the RF transmitter. That is, and referring back to FIG. 1, user device 102A may receive an RF signal from beacon 108 upon user device 102A coming in proximity to beacon 108.

At operation 302, data associated with the first user device is transmitted to the RF transmitter. For example, user device 102A, upon receiving the RF signal from beacon 108, may in turn transmit one or more of user A's profile, personal ID, preference information, and the like to beacon 108. In this embodiment, beacon 108 may be implemented with a receiver.

At operation 304, one or more subsequent interactive experiences is presented via the first user device based upon a categorization of the first user vice and the transmitted data. Referring back to FIG. 1, beacon 108, through network 112, may communicate with server 114/database 116 in order to effectuate categorization of user A/user device 102A in a manner similar to that described previously, but also accounting for user A-specific information, preferences, etc. One advantage to allowing for data exchange between beacon 108 and user device 102A is that user device 102A need not access a separate network, such as a cellular network, and incur charges for communicating over network 112. Instead, user device 102A need only communicate with beacon 108 using Bluetooth®, Wi-Fi, or other (cost-free) short-range communications protocol or technology. Moreover, a controlled wireless network can be provided.

Figure 4:
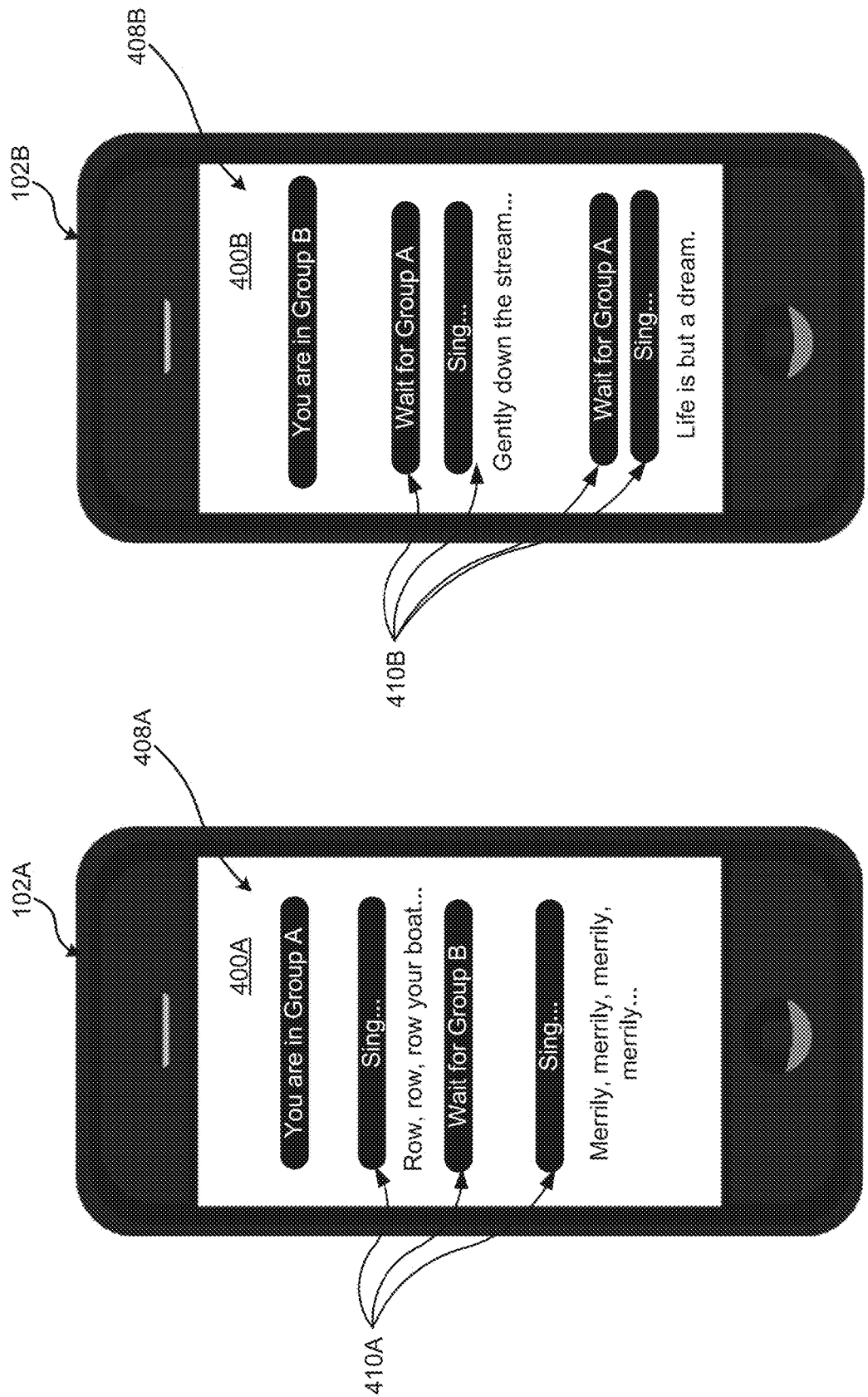
FIG. 4 illustrates an example user interface in accordance with various embodiments.

FIG. 4 illustrates an example graphical user interface (GUI) indicative of an interactive activity such as a group sing-a-long in which users can engage using their respective user devices upon being sorted in accordance with various embodiments described in the present disclosure. As discussed previously, RF signals transmitted by beacons 108 and 110, and received by user devices 102A and 102B, may be RF signals that communicate beacon identifying information, such as a unique ID. Upon receiving an RF signal from beacon 108, for example, an application resident on user device 102A parses the RF signal to determine the unique ID. The application may then access a local datastore, such as memory unit 106A or remotely located server 114, and associate the unique ID value with some group or category. User device 102B may perform similar operations so that user device 102B may be grouped or categorized.

In the example illustrated in FIG. 4, user A (via user device 102A) may be tagged as belonging to "Group A," while user B (via user device 102B) may be tagged as belonging to "Group B." Accordingly, user device 102A displays on display 408A, a GUI 400A indicating to user A that he/she is in Group A. Similarly, user device 102B displays on display 408B, a GUI 400B indicating to user B that he/she is in Group B. Corresponding instructions may then be presented to users A and B commensurate with their grouping. For example, GUI 400A displays instructions 410A to sing certain lyrics or wait for Group B and GUI 400B displays instructions 410B to sing certain lyrics or wait for Group A, such that song, in this example, "Row Your Boat," can be performed with alternating lyrics being sung between Groups A and B.

Figure 5:
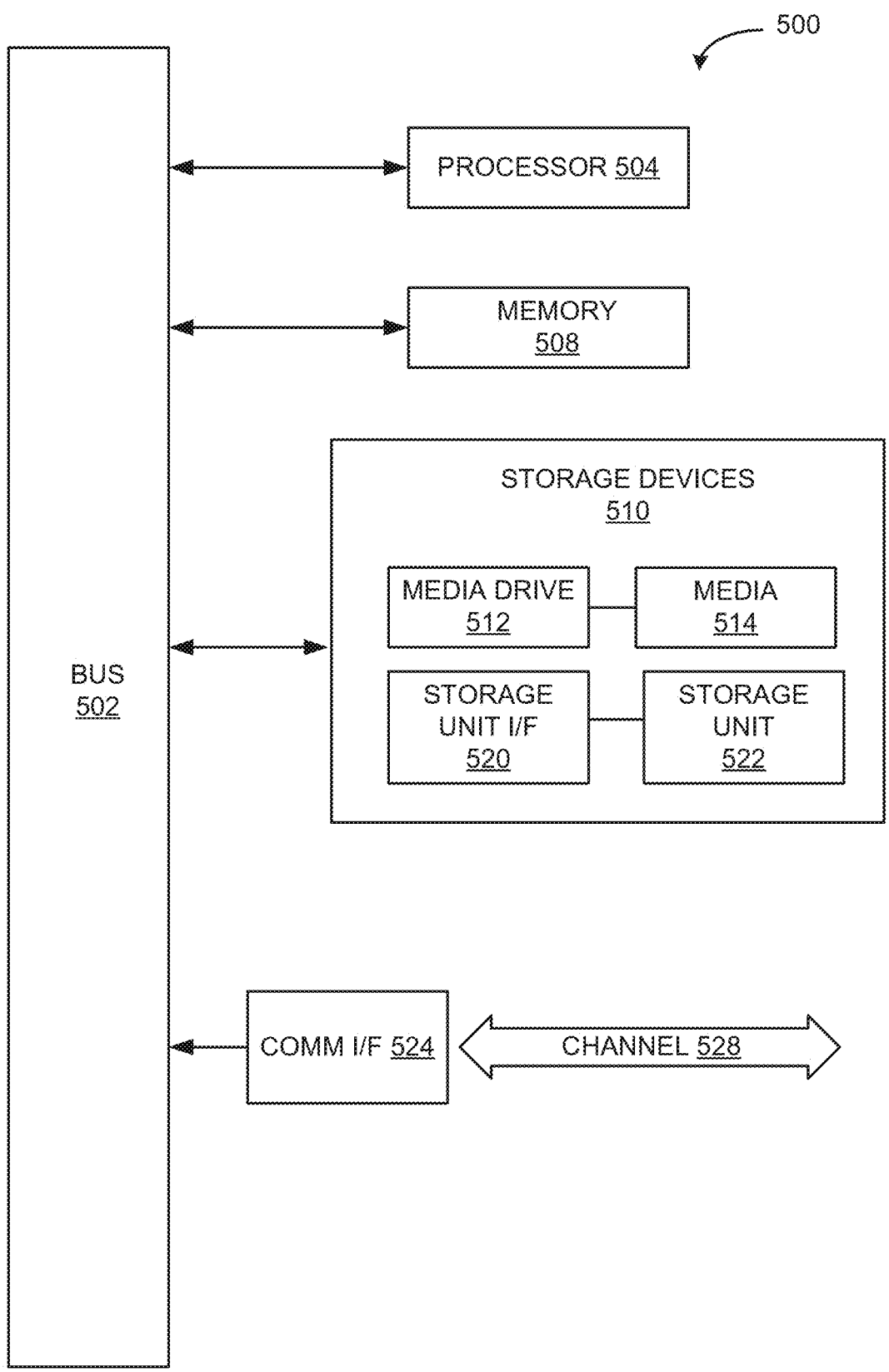
FIG. 5 is an example computing module that may be used to implement various features of embodiments described in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5 which may be used to implement various features of the system and methods disclosed herein. Various embodiments are described in terms of this example-computing module 500. After reading this description, it will become apparent to a person skilled in the relevant art how to implement the application using other computing modules or architectures.

Referring now to FIG. 5, computing module 500 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. For example, computing module 500 may be one embodiment of user device 102A or 102B and/or one or more functional elements thereof. Computing module 500 might also represent computing capabilities embedded within or otherwise available to a given device. For example, a computing module might be found in other electronic devices such as, for example navigation systems, portable computing devices, and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed:

1. A computer-implemented method for sorting, comprising:
 receiving a first signal from a first beacon at a first user device proximate to the first beacon, wherein the first signal communicates first beacon identifying information;
 receiving a second signal from a second beacon at a second user device proximate to the second beacon, wherein the second signal communicates second beacon identifying information;
 associating a first user of the first user device with a first group by parsing the first signal to determine the first beacon identifying information, wherein the first user remains associated with the first group after the first user device is outside a proximity of the first beacon;
 associating a second user of the second user device with a second group by parsing the second signal to determine the second beacon identifying information, wherein the second user remains associated with the second group after the second user device is outside a proximity of the second beacon; and
 wherein the first and second groups are utilized to distinguish the first and second users in one or more subsequent activities.

2. The computer-implemented method of claim 1, further comprising accessing a local memory to correlate the first beacon identifying information with the first group and correlate the second beacon identifying information with the second group.

3. The computer-implemented method of claim 1, further comprising accessing at least one of a remote server and database to correlate the first beacon identifying information with the first group and accessing the at least one of the remote server and the database to correlate the second beacon identifying information with the second group.

4. The computer-implemented method of claim 1, wherein the first signal comprises a first identifier identifying the first beacon and an indication of the first group, and wherein the second signal comprises a second identifier identifying the second beacon and an indication of the second group.

5. The computer-implemented method of claim 1, further comprising notifying, via the first and second user devices, the first and second groups to which the first and second user belong, respectively.

6. The computer-implemented method of claim 1, further comprising associating one or more characteristics associated with each of the first and second users to each of the first and second groups, respectively, for use in the one or more subsequent activities.

7. The computer-implemented method of claim 1, wherein the first and second groups comprise competing thematic aspects related to media content associated with the one or more subsequent activities.

8. The computer-implemented method of claim 7, wherein the one or more subsequent activities comprises at least one of interactive games, passive games, media content discovery, physical sorting of at least the first and second users into competitive teams, profile modification for association with at least one of the first and second groups, and purchase transactions.

9. The computer-implemented method of claim 1, further comprising implementing fraud protection in the one or more subsequent activities based upon the association of the first user with the first group such that the association of the first user with the first group is a verification of the first user's presence at or near the first beacon.

10. A computer-implemented method for sorting, comprising:
 receiving a radio frequency (RF) signal from an RF transmitter at a first user device upon the first user device coming in proximity to the RF transmitter, wherein the RF signal communicates RF transmitter identifying information;
 associating a first user of the first user device with a first group by parsing the RF signal to determine the RF transmitter identifying information;
 transmitting data associated with the first user device to the RF transmitter; and
 presenting one or more subsequent interactive experiences via the first user device based upon a categorization into the first-group and the transmitted data, wherein the first user device remains associated with the first group after the first user device is outside the proximity of the RF transmitter.

11. The computer-implemented method of claim 10, wherein the RF signal from the RF transmitter comprises an identifier identifying the RF transmitter, and wherein the data associated with the first user device comprises characteristics or preferences associated with the first user of the first user device.

12. The computer-implemented method of claim 11, wherein the RF transmitter further comprises an RF receiver adapted to receive the data associated with the first user device and forward the data to a server to determine the categorization of the first user device.

13. The computer-implemented method of claim 10, further comprising:
 receiving a second RF signal from a second RF transmitter at a second user device upon the second user device coming in proximity to the second RF transmitter wherein the RF signal communicates second RF transmitter identifying information;
 associating a second user of the second user device with a second group by parsing the RF signal to determine the RF transmitter identifying information; and
 transmitting data associated with the second user device to the second RF transmitter.

14. The computer-implemented method of claim 13, further comprising presenting the one or more subsequent interactive experiences via the second user device based upon a categorization into the second group and the transmitted data associated with the second user device.

15. The computer-implemented method of claim 14, wherein the one or more subsequent interactive experiences comprises a game in which the categorization of the first user device and the categorization of the second user device is used as a basis for competition in the one or more subsequent interactive experiences between a first user of the first user device and the second user of the second user device.

16. The computer-implemented method of claim 13, wherein the categorization of the first user device remains the same if the first user device has been previously categorized, changes from a previous categorization, or is utilized as a subsequent indication of affinity.

17. A system, comprising:
 a first user device;

a second user device;

a first identification device with which the first user device exchanges first information used in categorizing the first user device in a first group when the first user device is proximate to the first identification device by parsing the first information to determine first identifying information corresponding to the first identification device, wherein the first information communicates the first identifying information; and a second identification device with which the second user device exchanges second information used in categorizing the second user device in a second group when the second user device is proximate to the second identification device by parsing the second information to determine first identifying information corresponding to the first identification device, wherein the first information communicates the first identifying information;

wherein the categorization of the first user device in the first group and the categorization of the second user device in the second group is used to distinguish a first user of the first user device and a second user of the second user device in a subsequent activity in which the first and second users participate, and wherein the first user remains associated with the first group after the first user device is outside a proximity of the first identification device and the second user remains associated with the second group after the second user device is outside a proximity of the second identification device.

18. The system of claim 17, wherein the first identification device comprises one of a transmitter beacon adapted to transmit identification information associated with the first identification device to the first user device and a radio frequency (RF) sensor adapted to sense the identity of the first user device.

19. The system of claim 17, wherein the second identification device comprises one of a transmitter beacon adapted to transmit identification information associated with the second identification device to the second user device and a radio frequency (RF) sensor adapted to sense the identity of the second user device.

20. The system of claim 17, further comprising a remote server or database adapted to correlate the first information to the first group and correlate the second information to the second group.

\* \* \* \* \*